US 6,557,714 B2

(12) United States Patent
Babcock et al.

(10) Patent No.: US 6,557,714 B2
(45) Date of Patent: May 6, 2003

(54) TAMPER-EVIDENT PACKAGE

(75) Inventors: David E. Babcock, Lafayette, IN (US); Lawrence Smeyak, Lafayette, IN (US); Coy Hearld, West Lafayette, IN (US)

(73) Assignees: Alcoa Closure Systems International, Inc., Crawfordsville, IN (US); Graham Packaging Company, York, PA (US)

( * ) Notice: Subject to any disclaimer, the term of this patent is extended or adjusted under 35 U.S.C. 154(b) by 0 days.

(21) Appl. No.: 09/815,120

(22) Filed: Mar. 22, 2001

(65) Prior Publication Data

US 2002/0134747 A1 Sep. 26, 2002

(51) Int. Cl.$^7$ .............................................. B65D 41/34
(52) U.S. Cl. ...................................... 215/252; 215/258
(58) Field of Search .............................. 215/252, 256, 215/258, 330

(56) References Cited

U.S. PATENT DOCUMENTS

| | | | |
|---|---|---|---|
| 2,423,582 A | | 7/1947 | Coleman |
| 3,199,702 A | | 8/1965 | Fischbach |
| 3,415,403 A | | 12/1968 | Bardell |
| 3,904,061 A | * | 9/1975 | Keeler ........................ 215/252 |
| 4,180,175 A | * | 12/1979 | Virog et al. ................. 215/252 |
| 4,345,690 A | | 8/1982 | Hopley |
| 4,345,691 A | | 8/1982 | Burke |
| 4,418,828 A | | 12/1983 | Wilde et al. |
| 4,423,820 A | | 1/1984 | Vangor |
| 4,497,765 A | | 2/1985 | Wilde et al. |
| 4,534,480 A | | 8/1985 | Santostasi et al. |
| 4,592,476 A | | 6/1986 | Yasada |
| 4,609,115 A | | 9/1986 | Moore et al. |
| 4,630,743 A | | 12/1986 | Wright |
| 4,635,808 A | | 1/1987 | Nolan |
| 4,638,917 A | | 1/1987 | Persch |
| 4,813,561 A | | 3/1989 | Ochs |
| 4,818,828 A | | 4/1989 | Curley et al. |
| 4,978,017 A | | 12/1990 | McBride |
| 5,190,177 A | * | 3/1993 | Collins ........................ 215/252 |
| 5,205,426 A | | 4/1993 | McBride et al. |
| 5,307,946 A | * | 5/1994 | Molinaro ..................... 215/256 |
| 5,314,085 A | | 5/1994 | Bonet |
| 5,346,082 A | | 9/1994 | Ochs et al. |
| 5,480,045 A | | 1/1996 | Molinaro et al. |
| 5,829,611 A | | 11/1998 | Beck |
| 5,860,542 A | | 1/1999 | Takamatsu |
| 5,915,579 A | | 6/1999 | Przytulla et al. |
| 5,950,850 A | | 9/1999 | Takamatsu et al. |
| 6,044,992 A | | 4/2000 | Ma |
| 6,056,136 A | * | 5/2000 | Taber et al. ................. 215/252 |
| 6,085,921 A | | 7/2000 | Brown |
| 6,109,465 A | | 8/2000 | Henning |
| 6,112,923 A | | 9/2000 | Ma |

FOREIGN PATENT DOCUMENTS

| | | |
|---|---|---|
| EP | 0 008 190 | 2/1980 |
| GB | 1052734 | 12/1966 |
| GB | 1054308 | 1/1967 |
| GB | 2 068 912 | 8/1981 |
| GB | 2311060 | 9/1997 |
| WO | PCT/US02/08672 | 3/2002 |

* cited by examiner

Primary Examiner—Nathan J. Newhouse
(74) Attorney, Agent, or Firm—Wood, Phillips, Katz, Clark & Mortimer; Edward L. Levine

(57) ABSTRACT

A tamper-evident package includes a plastic closure having a top wall portion, a depending annular skirt portion, and a tamper band at least partially detachably connected to the skirt portion. The package further includes a container having a neck portion configured for tamper-indicating cooperation with the projections on the tamper band. The container includes a plurality of circumferentially spaced ratchet-like locking teeth, each of which presents a locking surface for interfering engagement with a respective one of the projections of the closure tamper band. The arrangement is particularly configured to promote rapid tamper-indication attendant to relatively little rotation of the closure relative to the container.

17 Claims, 3 Drawing Sheets

TAMPER-EVIDENT PACKAGE

TECHNICAL FIELD

The present invention relates generally to tamper-evident packaging for products, and more particularly to a tamper-evident package comprising a container and cooperating closure which are particularly configured for efficient, high-speed closure application and convenient opening by consumers, while still reliably providing visually discernable evidence of opening.

BACKGROUND OF THE INVENTION

Tamper-evident packaging is in very widespread use by virtue of the assurance it provides to consumers that contents of the package are fresh and unadulterated. While it is known to provide packages with tamper-evident overwraps, heat-shrinkable films, and like arrangements for showing that a package has been opened, such arrangements undesirably add to the cost of packaging, and complicate high-speed processing. In view of this, packaging arrangements have been developed, particularly closures for containers, which include a tamper-evident feature as part of the closure structure. By way of example, U.S. Pat. Nos. 4,418,828, 4,497,765, and 5,205,426, all hereby incorporated by reference, illustrate tamper-evident plastic closure constructions which have met with widespread acceptance in the marketplace by virtue of their reliable function and economical manufacture, and suitably high-speed application with automated packaging equipment.

Closures illustrated in the above-referenced patents have proven particularly effective for use on containers having carbonated contents, with such closures particularly configured to provide the necessary sealing characteristics for sealing such pressurized contents. For other applications, however, where sealing of pressurized contents is not required, closures can be configured to provide other desirable features. For example, for packaging of non-carbonated beverages, such as isotonic "sport drinks", juices, water, and the like, it can be desirable to provide a relatively "low profile" closure, that is, a closure having a relatively short height, in comparison to its diameter. It can be particularly desirable to configure such arrangements with so-called "multi-start" thread formations, which include plural helical thread elements which cooperate to effect closure retention and sealing, while permitting closure application and removal with relatively little rotation relative to the associated container.

Many tamper-evident arrangements heretofore known provide tamper-indication attendant to a certain degree of relative rotation between a tamper-evident closure and the associated container. However, for those applications in which use of a multi-start thread is desirable for ease of closure removal and application, tamper-evidence must be provided attendant to such relatively small relative rotation during closure removal. The tamper-evident package of the present invention has been particularly configured to provide reliable tamper-evidence in a construction which can be configured for relatively small opening rotation of a closure with respect to its associated container.

SUMMARY OF THE INVENTION

A tamper-evident package embodying the principles of the present invention includes a cooperating plastic closure and container, wherein the neck portion of the container has been particularly configured to provide tamper-indicating cooperation with the associated closure. As will be further described, the closure includes a plurality of circumferentially spaced, inwardly extending flexible projections which cooperate with a plurality of circumferentially spaced ratchet-like locking teeth on the container to provide tamper-evidence during opening of the package. Notably, the arrangement is configured such that tamper-evidence is provided attendant to very little relative rotation of the closure with respect to the container, thus permitting the invention to be configured in a package which promotes easy and convenient application and removal of the closure.

The container of the present tamper-evident package has a neck portion defining an opening, with the container having an external thread formation on the neck portion. The thread formation includes at least one helical thread element, with the presently preferred configuration comprising a plurality of thread elements, sometimes referred to as "multi-start" threads, to permit the package to be opened by very little relative rotation of the associated closure. However, the package can be configured with a single helical thread element, or may be configured with cooperating lug-type thread elements on the container and associated closure.

In accordance with the present invention, the container includes a plurality of circumferentially spaced locking teeth positioned on the neck portion of the container beneath the thread formation. Each of the locking teeth has a generally ratchet tooth-like configuration, and includes a locking surface, and a generally outwardly tapering guide surface, opposite the locking surface, extending from the neck portion to the locking surface. In the preferred embodiment, the locking surface of each locking tooth is generally radially and vertically oriented. Notably, the locking teeth are unevenly circumferentially spaced about the neck portion, with the spacing corresponding to the spacing between the flexible projections on the closure tamper band, or multiples thereof. The disclosed configuration desirably provides tamper-evidence attendant to a small degree of rotation of the closure relative to the container.

The closure of the present tamper-evident package is configured for fitment to the neck portion of the container for closing the opening therein. The closure includes a top wall portion and a depending annular skirt portion having an internal thread formation for mating engagement with the external thread formation on the neck portion of the container. Like the preferred form of the container, the closure preferably includes a multi-start thread formation, including plural helical thread elements, to promote convenient application and removal of the closure.

The closure is configured for tamper-indicating cooperation with the container by the provision of a tamper band depending from and at least partially detachably connected to the skirt portion of the closure by a frangible connection. While the illustrated embodiment of the closure of the present package is configured for complete detachment of the tamper band from the skirt portion, it is within the purview of the present invention that the tamper band remain joined to the skirt portion attendant to closure removal, which can be effected by the provision of a non-fracturable connector element joining the tamper band to the skirt portion.

The tamper band includes an annular band portion, and a plurality of inwardly extending flexible projections each movable about a respective horizontal hinge portion joined to the annular band portion. In the preferred form, the hinge portion of each of the projections is relatively thin, thus promoting high-speed application of the closure to the container with minimal resistance from the tamper band.

At least one of the projections of the tamper band is engageable with at least one of the locking teeth on the container, during removal of the closure from the container, for fracturing the frangible connection to provide visual evidence of opening of the package. Preferably, the present package is configured such that a plurality of the projections on the tamper band are configured to be substantially simultaneously engageable with a like plurality of the locking teeth on the container for fracturing the frangible connection between the tamper band and the skirt portion. The cooperation of a plurality of projections and teeth acts to assure consistent and rapid fracturing of the frangible connection between the tamper band and the skirt portion. In the preferred form, there are a sufficient number of projections on the tamper band, and a sufficient number of locking teeth on the container to fracture the frangible connection before the closure has rotated, relative to the container, no more than about 15 to 20 degrees during closure removal. This assures rapid tamper-indication, as is particularly desirable with a multi-start thread formation which, in the illustrated embodiment, is configured to provide opening attendant to 60 degrees of rotation of the closure relative to the container.

As noted, the locking teeth on the container are unevenly circumferentially spaced about the neck portion of the container to promote interfering engagement between a plurality of the projections and a plurality of the locking teeth. In the illustrated embodiment, the neck portion of the container defines a mold parting line, that is, the line or plane at which the mold halves for the neck portion separate. The container includes a first pair of locking teeth each having the locking surface thereof aligned with the mold parting line. A second pair of locking teeth are positioned at right angles to the first pair of locking teeth, with the region between the locking surface of each of the second teeth and the guide surface of a respective on of the first teeth positioned generally at right angles thereto being free of locking teeth. The container further includes at least one locking tooth positioned in spaced relationship between one of the first pair and one of the second pair of locking teeth. The spacing of this further locking tooth corresponds to the spacing between the flexible projections of same tamper band, or multiples thereof. This preferred configuration can result in uneven circumferential spacing of the further locking tooth, depending upon the number of flexible projections on said tamper band.

Additional features of the present package promote the desired locking, interfering engagement between the projections and the locking teeth during closure removal, as well as high-speed application. In a current embodiment, a diameter of the neck portion of the container at the locking teeth is generally equal to a diameter of the neck portion at the thread formation, contributing to formation of a relatively lightweight container. In contrast, the projections of the closure define an inside diameter, when the projections are in a generally horizontally, inwardly extending orientation, which is greater than the diameters of the neck portion at the external thread formation and of the locking teeth. By this arrangement, excessive engagement of the projections with the thread formation during closure application is avoided, thus facilitating high speed application, and permitting use of application devices such as driven belts, spinning wheels, and the like, as opposed to rotatably-driven capping heads. After application, the projections can assume a generally horizontal, inwardly extending orientation for effecting interfering engagement with the locking teeth.

Other features and advantages of the present invention will become readily apparent from the following detailed description, the accompanying drawings, and the appended claims.

DETAILED DESCRIPTION

Figure 1:
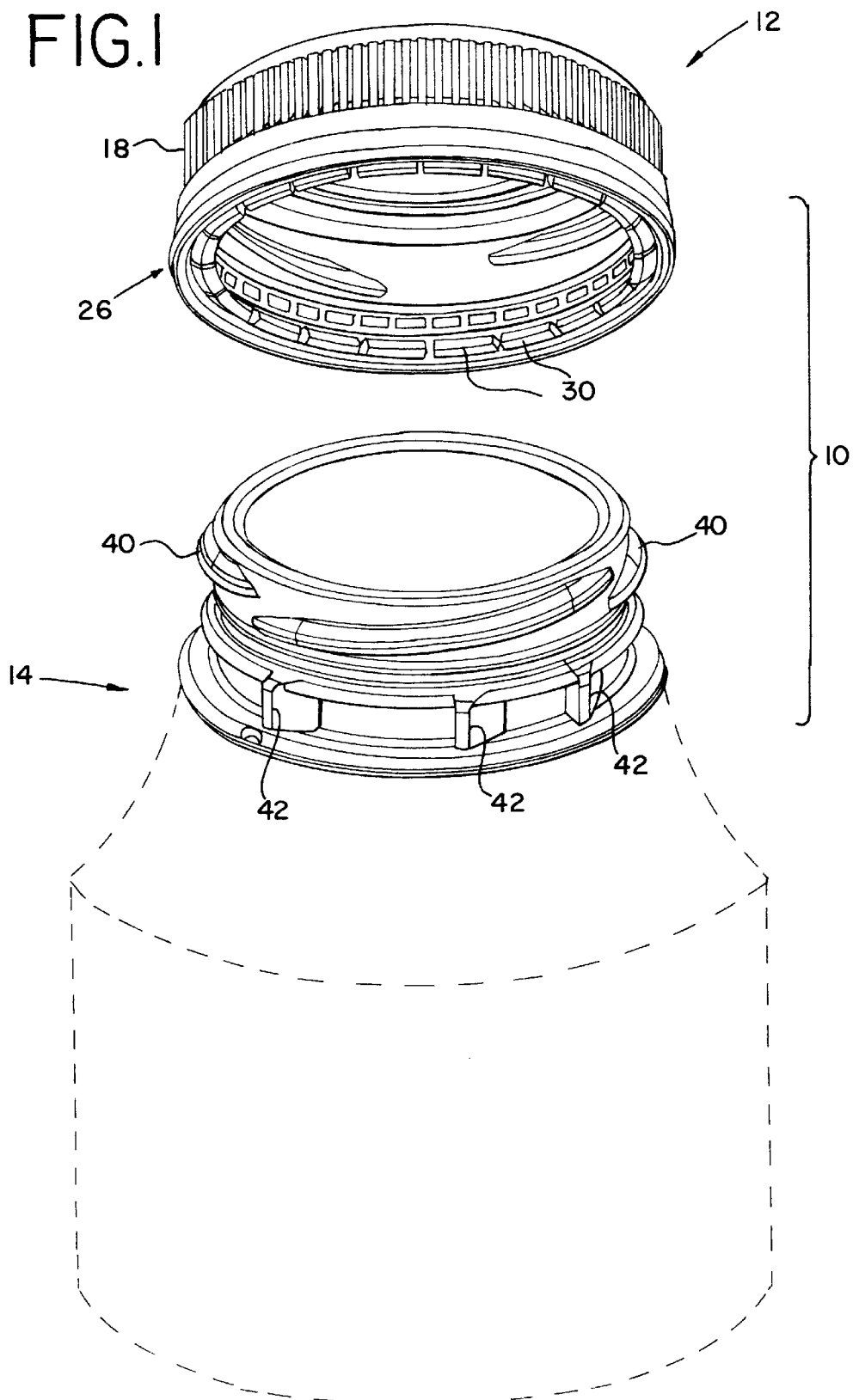
FIG. 1 is an exploded, perspective view of a tamper-evident package embodying the principles of the present invention, including a cooperating plastic closure and associated container.

While the present invention is susceptible of embodiment in various forms, there is shown in the drawings, and will hereinafter be described, a presently preferred embodiment, with the understanding that the present disclosure is to be considered as an exemplification of the invention, and is not intended to limit the invention to the specific embodiment illustrated.

With reference to FIG. 1, therein is illustrated a tamper-evident package 10 embodying the principles of the present invention. As will be further described, package 10 includes a cooperating closure 12 and container 14 (partially illustrated in phantom line) which can be configured for economical "single serve" use for beverages or like contents. In the illustrated embodiment, the present package is particularly suited for use with so-called "hot fill" beverages, including isotonic "sport drinks", fruit juices, and like beverages which are packages at elevated temperatures. For such applications, it is particularly desirable to configure the package for convenient opening and removal of the closure 12, with relatively little rotation of the closure relative to the container 14. Thus, as will be further described, the tamper-evident feature of the present package is particularly configured to promote tamper-indication attendant to very little rotation of the closure relative to the container.

Figure 2:
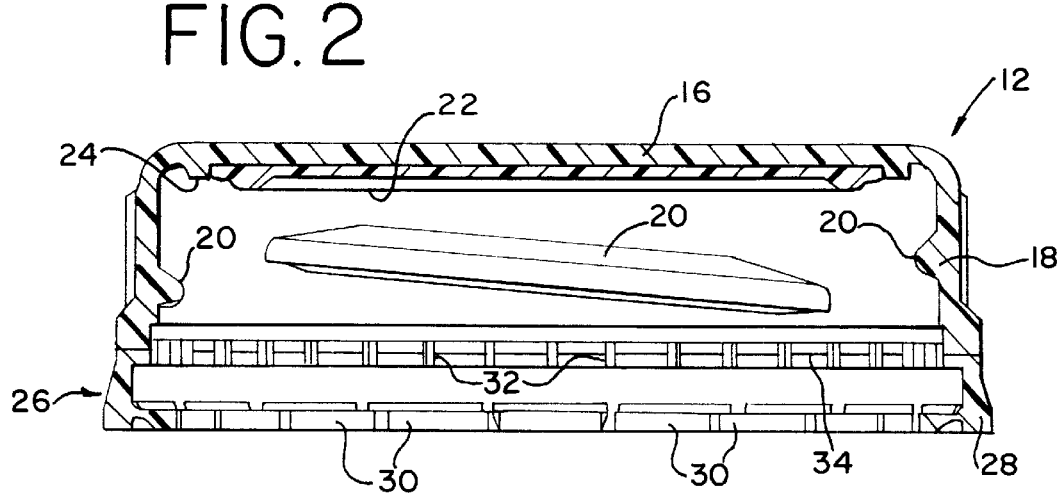
FIG. 2 is a cross-sectional view of the closure of the present package illustrated in FIG. 1.
Figure 3:
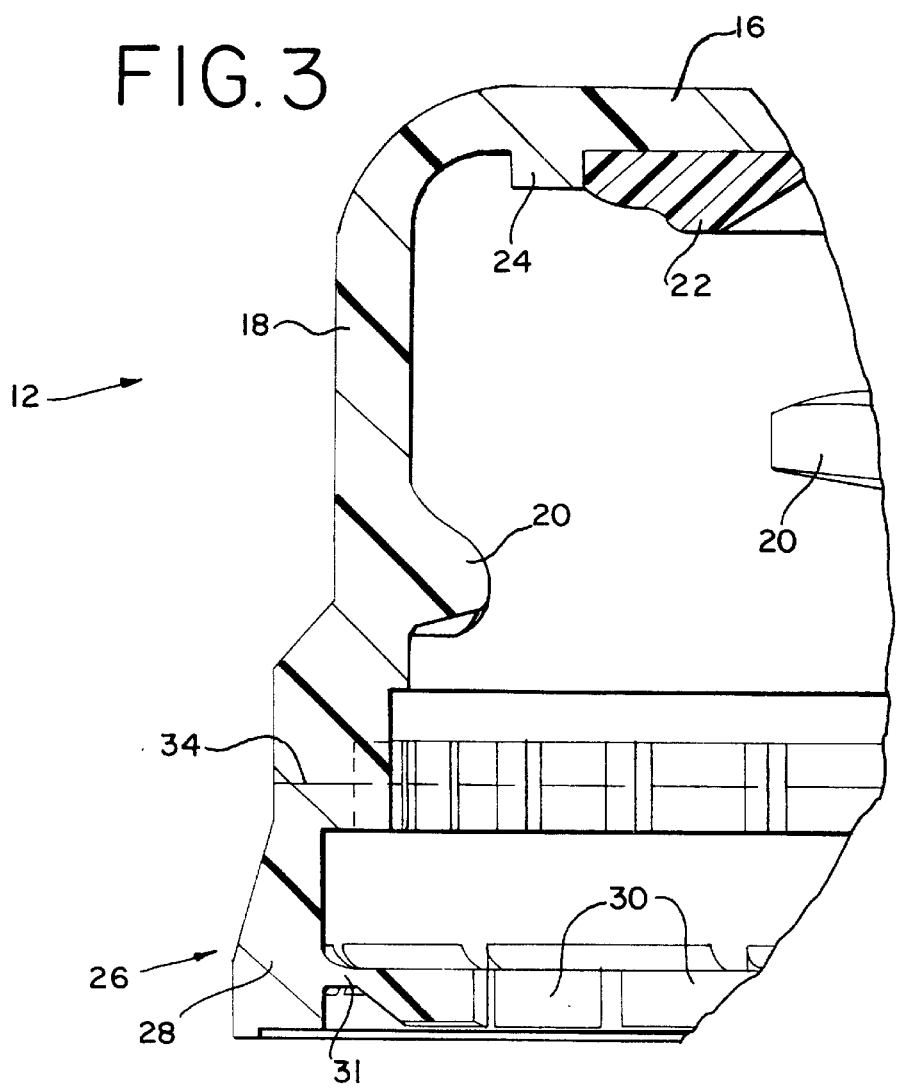
FIG. 3 is a relatively enlarged, fragmentary view of the closure illustrated in FIG. 2.

With particular reference to FIGS. 2 and 3, therein is illustrated the closure 12 of the present invention. Closure 12 is preferably molded from suitable polymeric material (typically polypropylene), and may be efficiently compression-molded in accordance with the teachings of U.S. Pat. No. 4,497,765, hereby incorporated by reference. The closure 12 is configured as a so-called "low profile" closure, with the closure having a relatively short height or profile, relative to its diameter. As illustrated, the closure includes a circular top wall portion 16, and a depending annular skirt portion 18. The skirt portion 18 includes an internal thread formation which, in the preferred form, comprises a plurality of generally helical thread elements 20, with the thread formation thus configured as a so-called multi-start thread. This arrangement facilitates application of the closure to the associated container with a relatively small degree of rotation of the closure relative to the container, with such relative rotation in the illustrated embodiment being on the order of 60 degrees.

In order to provide the desired sealing cooperation between the closure 12 and container 14, the closure includes a generally disc-shaped sealing liner 22 positioned on the inside surface of the top wall portion 16. An annular shoulder 24 surrounds the sealing liner 22, and cooperates with the sealing liner to form a so-called "top/inside" seal with the associated container 14, that is, the sealing liner 22 engages the generally upwardly and inwardly facing surfaces of the finish of the container 14. The sealing arrangement may be formed in accordance with the teachings of U.S. patent application Ser. No. 09/666,522, filed Sep. 20, 2000. Notably, this type of sealing arrangement may be configured to have a so-called seal length which maintains the seal between the closure 12 and container 14 until the tamper-evident feature of the package (described further hereinafter) fractures. Thus, the sealed condition of the package is maintained until and after tamper-evidence is provided, further acting to preclude undetected tampering.

The closure 12 includes a tamper band 26 at least partially detachably connected to the skirt portion 18 of the closure. The tamper band 26 includes an annular band portion 28, and a plurality of circumferentially spaced, inwardly extending tab-like projections 30. Each projection 30 is joined to the band portion 28 by a respective, relatively thin hinge portion 31 (FIG. 3) which promotes ease of application of the closure to the associated container, while still affording the desired surface-to-surface contact for locking interfering engagement between the projections and locking teeth (as will be described) on the container 12. In a current 38 mm closure embodiment, including twenty (20) of the projections 30 spaced at 18 degrees, each projection has a thickness of 0.035 inches and a circumferential dimension of 0.218 inches with a hinge portion 0.010 inches thick.

In order to provide the desired frangible connection between the tamper band 26 and the skirt portion 18 of the closure 12, the closure includes a plurality of circumferentially spaced frangible bridges 32 which extend between the inside surfaces of the skirt portion 18 and the pilfer band 26. The frangible connection is further provided by a circumferentially extending score line 34 which distinguishes the pilfer band 26 from the skirt portion 18. Score line 34 is formed generally through the side wall of the closure so that the annular band portion 28 is separated from skirt portion 18, with the score line further extending partially into the frangible ribs 32. Unscored, "residual" portions of the frangible ribs 32 provide the desired frangible connection between the tamper band and the skirt portion. In the present embodiment, it is contemplated that the tamper band 26 completely separate from the skirt portion 12 during closure removal, with the tamper band remaining in place on the associated container 12. However, it is within the purview of the present invention that the tamper band be configured for partial detachment from the skirt portion 18, such as by the provision of a relatively strong connector portion between the tamper band 26 and skirt portion 18.

Figure 4:
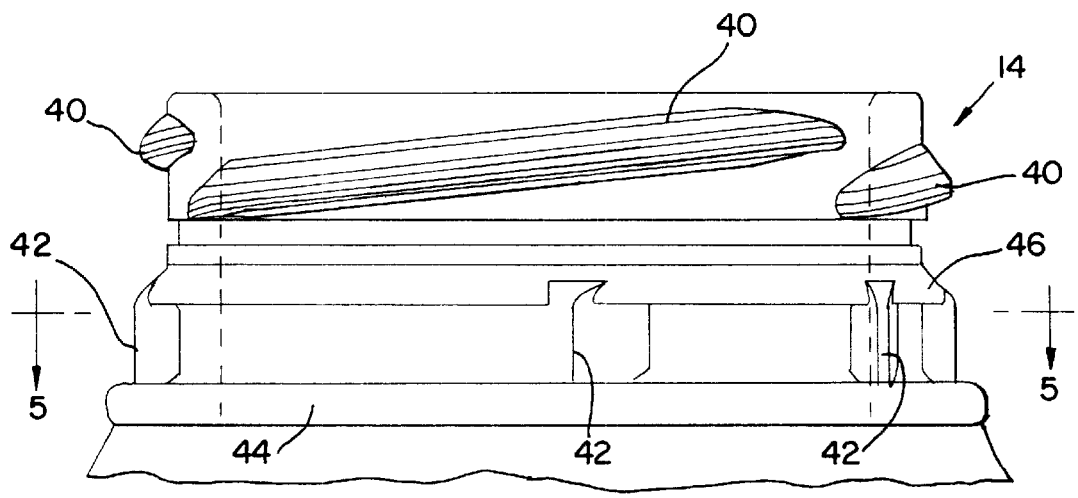
FIG. 4 is fragmentary, side elevational view of a neck portion of the container of the present package illustrated in FIG. 1.
Figure 5:
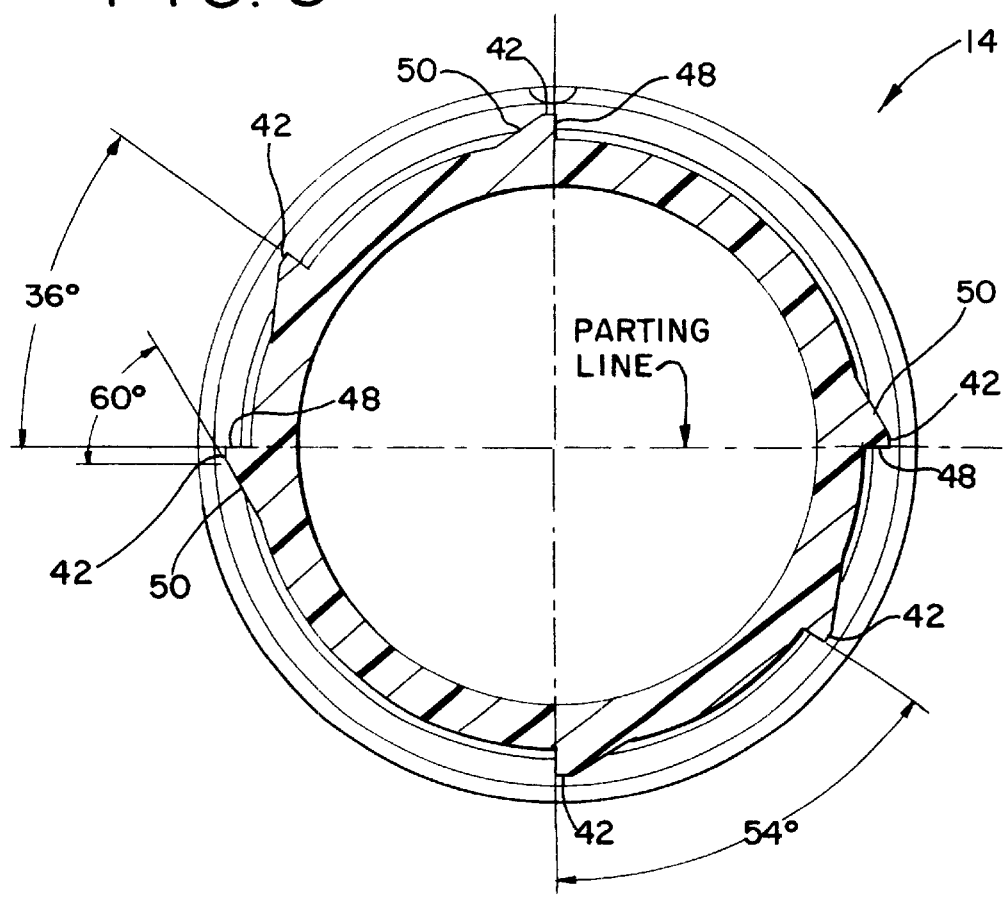
FIG. 5 is a cross-sectional view taken generally along lines 5—5 of FIG. 4.

With particular reference to FIGS. 4 and 5, therein is illustrated the container 14 of the present tamper-evident package. As shown, the container 14 includes a neck portion defining an opening, with the closure 12 being configured for fitment to the neck portion for closing the opening defined thereby. In order to promote rapid application and removal of the closure, the neck portion of the container 14 includes an external thread formation thereon, with the thread formation on the container configured for mating engagement with the internal thread formation of the closure 12. To this end, the thread formation of the container includes a plurality of helical thread elements 40 for respective cooperation with the thread elements 20 of closure 12. In the illustrated embodiment, three of the cooperating thread elements are provided on each of the closure and container, with the illustrated configuration arranged to provide opening movement attendant to 60 degrees of rotation of the closure relative to the container. However, the present package may be configured with a single helical thread element. The present package may alternatively be provided with cooperating lug-type thread elements on the container 14 and closure 12.

In accordance with the present invention, the container 14 includes a plurality of circumferentially spaced locking teeth 42 provided on the neck portion of the container. The locking teeth 42 are configured to cooperate with the projections 30 of the closure 12 during closure removal by interferingly engaging the projections. By this cooperative engagement, the frangible connection between the tamper band 26 and the skirt portion 18 of the closure 12 is fractured, thus providing clear visual evidence that the package has been opened.

As illustrated, the neck portion of the container 14 includes an annular shoulder 44 positioned beneath the locking teeth 42, and an annular shoulder 46 positioned generally above the locking teeth. The shoulders desirably act to confine the projections 30 of the closure tamper band in a position for interfering engagement with the locking teeth 42, and deter manipulation of the projections. Additionally, the outwardly tapering configuration of the upper annular shoulder 46 desirably acts to guide and upwardly flex the projections 30 during closure application, whereafter the projections assume a generally horizontally inwardly configuration for interfering engagement with the locking teeth 42.

In accordance with the preferred form, each of the locking teeth 42 includes a generally radially and vertically oriented locking surface 48 positioned for engagement with a respective one of the projections 30 of the closure 12. Each of the locking teeth further includes a ramp-like outwardly tapering guide surface 50 which extends outwardly from the neck portion, generally opposite of the locking surface 48. The guide surface 50 is oriented such that during rotational application of the closure 12 to the container (by right-hand rotation in accordance with the illustrated embodiment), the projections 30 of the closure tamper band are guided by the surface 50 and urged generally outwardly over the locking teeth 42. As each of the projections 30 passes one or more of the locking teeth, the resilience of the projections, which are preferably molded in a horizontally inwardly extending, horizontal orientation, acts to return the projections to a generally inwardly extending orientation. This inwardly extending orientation desirably promotes interfering engagement between the projections 30 and the locking surfaces of the locking teeth 42. In the illustrated embodiment, as shown in FIG. 5, each guide surface 50 is oriented at a 60 degree angle relative to a line tangent to a circle defined by the locking teeth.

As further illustrated in FIG. 5, it will be observed that the locking teeth 42 are unevenly circumferentially spaced about the neck portion of the closure 12, with the spacing between the teeth corresponding to the spacing between projections 30 (i.e., 18 degrees in the illustrated embodiment), or multiples thereof. This assures substantially simultaneous engagement of a plurality of the projections 30 with a like plurality of the locking teeth during closure removal. FIG. 5 illustrates a mold parting line defined by the neck portion of the container 14, which corresponds to the line or plane along which the mold for the neck portion opens. As illustrated, the closure 14 includes a first pair of the locking teeth 42 having their respective locking surfaces 48 aligned with the parting line. Additionally, a second pair of the locking teeth 42 are positioned at right angles to the first pair of locking teeth. As will be observed, the region between the locking surface 48 of one of the second teeth and the guide surface 50 of a respective one of the first teeth positioned generally at a right angle thereto is free of locking teeth, thereby avoiding formation of "undercut" regions which cannot be efficiently released from a mold.

FIG. 5 further illustrates the provision of at least one locking tooth positioned in unevenly circumferentially spaced relationship between one of the first pair and one of the second pair of locking teeth. As shown, these unevenly spaced locking teeth are positioned, in the illustrated embodiment, at angles of 36 degrees and 54 degrees relative to the adjacent locking teeth 42. As will be recognized, this spacing corresponds to multiples of the 18 degree spacing between the projections 30 of the tamper band. Depending upon the number and spacing of the projections 30, each of these additional locking teeth may or may not be unevenly spaced with respect to the ones of the first and second pairs of teeth between which they are positioned.

This presently preferred spacing of the locking teeth 42 has been found to desirably promote substantially simultaneous contact between a plurality of the projections 30 of the tamper band 26 and the locking teeth. Because it is desired that the frangible connection of the tamper band fracture with as little relative rotation of the closure as possible, it is desirable to have plural ones of the projections engaging all, or substantially all, of the locking teeth 42 in a substantially simultaneous fashion. The illustrated uneven circumferential spacing of the locking teeth permits the present package to be configured to promote such rapid tamper-indication. It is presently preferred that the frangible connection between the tamper band 26 and the skirt portion 18 take place before no more than about 15 to 20 degrees of rotation of the closure 12 relative to the container 14.

The number and spacing of locking teeth 42 has been selected to facilitate efficient manufacture of the container 14, as well as to promote rapid tamper-indication attendant to closure removal. Similarly, the number and spacing of the projections 30 of the tamper band 26 have been selected to promote rapid tamper-indication. A sufficient number of the projections 30 are provided so as to minimize the removal rotation of the closure prior to engagement of one or more of the projections with the locking teeth 42 on the container. The projections 30 are spaced sufficiently apart so as to preclude interference between adjacent ones of the projections, which could otherwise result in upward movement of one of the projections causing an adjacent one of the projections to be lifted upwardly therewith.

By configuring the projections to collectively define an inside diameter (1.398 inches in a current embodiment) which is greater than the diameter of the neck portion at the base of thread elements 40 (1.370 inches), the closure is relatively easy to apply, with the projections 30 readily moving past the thread formation so that the thread elements 20 of the closure are quickly moved into threading engagement with the thread elements 40 of the container. As noted, this ease of application facilitates use of closure application belts and wheels, which can efficiently apply closures to containers without resort to rotatably-driven capping heads which individually act upon closures for respective application to containers. Additionally, the inside diameter defined by the projections 30 in their inwardly extending, horizontal orientation (1.398 inches) is greater than the diameter of the neck portion at the base of the locking teeth 42 (1.370 inches, with the locking teeth defining a diameter of 1.484 inches). This assures sufficient space for the projections to fully extend horizontally inwardly for enhancing the desired interfering engagement with locking teeth 42. At the same time, the diameter of the container at the base of the locking teeth is less than the outside diameter of the container thread formation, and generally equal to the diameter of the container at the root of the threads. The desired tamper-evident arrangement is thus provided while minimizing the dimensions of the neck portion, thus facilitating weight savings and economical manufacture.

From the foregoing, numerous modifications and variations can be effected without departing from the true spirit and scope of the novel concept of the present invention. It is to be understood that no limitation with respect to the specific embodiment illustrated herein is intended or should be inferred. The disclosure is intended to cover, by the appended claims, all such modifications as fall within the scope of the claims.

What is claimed is:

1. A tamper-evident package, comprising:
   a container having a neck portion defining an opening, said container having an external thread formation on said neck portion, said thread formation including at least one helical thread element,
   said container further including a plurality of circumferentially spaced locking teeth positioned on said neck portion beneath said thread formation, and
   a closure configured for fitment to the neck portion of said container for closing said opening, said closure including a top wall portion and a depending annular skirt portion having an internal thread formation for mating engagement with the external thread formation on said neck portion of said container,
   said closure including a tamper band depending from and at least partially detachably connected to said skirt portion by a frangible connection, said tamper band including an annular band portion, and a plurality of inwardly extending flexible projections each movable about a respective horizontal hinge portion joined to said annular band portion, each of said projections having marginal edges defining the circumferential dimension of the projection, said marginal edge of at least one of said projections being engageable with at least one of said locking teeth on said container during removal of said closure from said container for fracturing said frangible connection to provide visual evidence of opening of said package,
   said locking teeth being unevenly circumferentially spaced about the neck portion of said container, with the spacing between said locking teeth corresponding to the spacing between said projections, or multiples thereof.

2. A tamper-evident package in accordance with claim 1, wherein:
   said container includes an annular shoulder positioned adjacent to and beneath said locking teeth.

3. A tamper-evident package in accordance with claim 2, wherein:
   said container includes another annular shoulder positioned adjacent to and above said locking teeth and beneath said external thread formation.

4. A tamper-evident package in accordance with claim 1, wherein:
   each of said locking teeth includes a generally radially oriented locking surface for engagement by at least one of said projections of said closure, and a generally outwardly tapering guide surface opposite said locking surface extending from said neck portion to said locking surface.

5. A tamper-evident package in accordance with claim 4, wherein:
said locking surface of each said locking tooth is generally vertically oriented.

6. A tamper-evident package in accordance with claim 4, wherein:
said projections define an inside diameter in a generally inwardly extending, horizontal orientation that is greater than a diameter of said neck portion at said thread formation.

7. A tamper-evident package in accordance with claim 1, wherein:
said hinge portion of each of said projections of said closure is relatively thin.

8. A tamper-evident package in accordance with claim 1, wherein:
said projections of said closure define an inside diameter in a generally horizontally, inwardly extending orientation which is greater than a diameter of said neck portion at said locking teeth.

9. A tamper-evident package in accordance with claim 1, wherein:
said external thread formation includes a plurality of helical thread elements.

10. A tamper-evident package, comprising:
a container having a neck portion with an external thread formation thereon including a plurality of helical thread elements,
said container including a plurality of circumferentially spaced locking teeth positioned on said neck portion beneath said thread formation, each said locking tooth including a locking surface, and a generally outwardly tapered guide surface extending from said neck portion opposite said locking surface, said locking teeth being unevenly circumferentially spaced about the neck portion of said container; and
said container including an annular shoulder positioned adjacent to and beneath said locking teeth, and another annular shoulder positioned adjacent to and above said locking teeth beneath said external thread formation;
a closure configured for fitment to the neck portion of said container, said closure including a top wall portion and a depending annular skirt portion having an internal thread formation for mating engagement with the external thread formation on said neck portion of said container,
said closure including a tamper band depending from and at least partially detachably connected to said skirt portion by a frangible connection, said tamper band including an annular band portion, and a plurality of inwardly extending flexible projections each movable about a respective, relatively thin horizontal hinge portion joined to said annular band portion, said projections being circumferentially spaced apart by a distance less than the circumferential dimension of each of said locking teeth on said container, each of said projections having marginal edges defining the circumferential dimension of the projection, said marginal edges of a plurality of said projections being engageable with a like plurality of said locking teeth during removal of said closure from said container for fracturing said frangible connection.

11. A tamper-evident package in accordance with claim 10, wherein:
said projections and said locking teeth are configured to fracture said frangible connection before said closure has been rotated relative to said container more than about 15 to 20 degrees during closure removal.

12. A tamper-evident package in accordance with claim 10, wherein:
said locking surface of each said locking tooth is generally radially and vertically oriented.

13. A tamper-evident package in accordance with claim 10, wherein:
the diameter of said container at the base of said thread formation is generally equal to the diameter of said container at the base of said locking teeth.

14. A tamper-evident package in accordance with claim 10, wherein:
said projections of said closure define an inside diameter in a generally horizontally, inwardly extending orientation which is greater than diameters of said neck portion at said external thread formation and at said locking teeth.

15. A tamper-evident package, comprising:
a container having a neck portion defining an opening, said container having an external thread formation on said neck portion, said thread formation including at least one helical thread element,
said container further including a plurality of circumferentially spaced locking teeth positioned on said neck portion beneath said thread formation, and
a closure configured for fitment to the neck portion of said container for closing said opening, said closure including a top wall portion and a depending annular skirt portion having an internal thread formation for mating engagement with the external thread formation on said neck portion of said container,
said closure including a tamper band depending from and at least partially detachably connected to said skirt portion by a frangible connection, said tamper band including an annular band portion, and a plurality of inwardly extending flexible projections each movable about a respective horizontal hinge portion joined to said annular band portion, at least one of said projections being engageable with at least one of said locking teeth on said container to provide visual evidence of opening of said package,
wherein said locking teeth are unevenly circumferentially spaced about said neck portion, and said neck portion of said container defines a mold parting line, said container including a first pair of locking teeth each having a locking surface thereof aligned with said parting line, and a second pair of said locking teeth positioned at right angles to said first pair of locking teeth and each having a locking surface, the region between the locking surface of each of said second teeth and the respective one of said first teeth positioned generally at a right angle thereto being free of locking teeth, said container further including at least one locking tooth positioned in unevenly circumferentially spaced relationship between one of said first pair and one of said second pair locking teeth.

16. A tamper-evident package, comprising:
a container having a neck portion with an external thread formation thereon including a plurality of helical thread elements, said container including a plurality of circumferentially spaced locking teeth positioned on said neck portion beneath said thread formation, each said locking tooth including a locking surface, and a generally outwardly tapered guide surface extending from said neck portion opposite said locking surface; and a closure configured for fitment to the neck portion of said container, said closure including a top wall portion and a depending annular skirt having an internal thread formation for mating engagement with the external thread formation on said neck portion of said container, said closure including a tamper band depending from and at least partially detachably connected to said skirt portion by a frangible connection, said tamper band including an annular band portion, and a plurality of inwardly extending flexible projections each movable about a respective, relatively thin horizontal hinge portion joined to said annular band portion, said projections being circumferentially spaced apart by a distance less than the circumferential dimension of each of said locking teeth on said locking teeth during removal of said closure from said container for fracturing said frangible connection, wherein said neck portion of said container defines a mold parting line, said container including a first pair of locking teeth having the locking surface thereof aligned with said parting line, and a second pair of said locking teeth positioned at right angles to said first pair of locking teeth, the region between the locking surface of each of said second locking teeth and the guide surface of a respective one of said first teeth positioned generally at a right angle thereto being free of locking teeth, said container further including at least one locking tooth positioned in spaced relationship between one of said first pair and one of said second pair of locking teeth, said spacing of said at least one locking tooth from said one of said first pair and said one of said second pair corresponding to the spacing between said flexible projections on said tamper band, or multiples thereof.

17. A tamper-evident package in accordance with claim 16, wherein:

said at least one locking tooth is unevenly circumferentially spaced between said one of said first pair and said one of said second pair of locking teeth.

* * * * *